US010545627B2

(12) United States Patent
Martinez Molina et al.

(10) Patent No.: US 10,545,627 B2
(45) Date of Patent: Jan. 28, 2020

(54) DOWNLOADING OF THREE-DIMENSIONAL SCENE DATA FOR ASYNCHRONOUS NAVIGATION

(71) Applicant: MICROSOFT TECHNOLOGY LICENSING, LLC, Redmond, WA (US)

(72) Inventors: Harold Anthony Martinez Molina, Redmond, WA (US); Michael Lee Smith, Kirkland, WA (US); Andrew John Howe, Sammamish, WA (US); Vidya Srinivasan, Issaquah, WA (US); Aniket Handa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/972,007

(22) Filed: May 4, 2018

(65) Prior Publication Data

US 2019/0339838 A1 Nov. 7, 2019

(51) Int. Cl.
*G06F 3/048* (2013.01)
*G06F 3/0481* (2013.01)
(Continued)

(52) U.S. Cl.
CPC ..... *G06F 3/04815* (2013.01); *G02B 27/0172* (2013.01); *G06F 3/0482* (2013.01); *G06F 16/954* (2019.01); *G06T 15/005* (2013.01)

(58) Field of Classification Search
CPC .. G06F 3/04815; G06F 16/954; G06F 3/0482; G02B 27/0172; G06T 15/005
See application file for complete search history.

(56) References Cited

U.S. PATENT DOCUMENTS 8,533,580 B1 9/2013 Xu
2011/0113334 A1* 5/2011 Joy ..................... G06F 16/4393
715/716
(Continued)

OTHER PUBLICATIONS

"AsyncOperation.allowSceneActivation", Retrieved From https://docs.unity3d.com/ScriptReference/AsyncOperation-allowSceneActivation.html, Mar. 28, 2018, 2 Pages.

(Continued)

*Primary Examiner* — Chong Wu
(74) *Attorney, Agent, or Firm* — Newport IP, LLC; Jacob P. Rohwer

(57) ABSTRACT

The disclosed techniques immediately download, to a head-mounted display device or to a device connected to a head-mounted display device, data used to render each of multiple three-dimensional scenes that are part of an experience. An experience includes related and/or linked content that can be accessed and/or displayed for a particular purpose. In various examples, the experience can initially be accessed using a computing device (e.g., a laptop, a smartphone, etc.). The immediate download can be implemented in response to a user switching consumption of the experience from a display of the computing device to a display of the head-mounted display device so three-dimensional scenes can be consumed in a three-dimensional immersive environment (e.g., a three-dimensional coordinate space displayed via the head-mounted display device). Data for individual ones of the three-dimensional scenes is instantiated (e.g., rendered and displayed) asynchronously based on user navigation to a next three-dimensional scene.

17 Claims, 6 Drawing Sheets

(51) Int. Cl.
  G02B 27/01 (2006.01)
  G06F 3/0482 (2013.01)
  G06T 15/00 (2011.01)
  G06F 16/954 (2019.01)

(56) References Cited

U.S. PATENT DOCUMENTS

2014/0071165 A1    3/2014   Tuchschmid et al.
2017/0309073 A1   10/2017   Sangiovanni et al.
2018/0154260 A1*   6/2018   Sawaki ................... G06F 3/011

OTHER PUBLICATIONS

"SceneManager.LoadSceneAsync", Retrieved From https://web.archive.org/web/20171029093217/https:/docs.unity3d.com/ScriptReference/SceneManagement.SceneManager.LoadSceneAsync.html, Oct. 29, 2017, 2 Pages.

Lemordant, et al., "Mixed Reality Browsers and Pedestrian Navigation in Augmented Cities", In Proceedings of Graphical Web Conference, Oct. 22, 2013, pp. 1-10.

Ruminski, et al., "CARL: A Language for Modelling Contextual Augmented Reality Environments", In Proceedings of 5th Doctoral Conference on Computing, Electrical and Industrial Systems, Apr. 7, 2014, pp. 183-190.

Vrignaud, et al., "Bringing Mixed Reality to the Web", Retrieved From https://blog.mozilla.org/blog/2017/10/20/bringing-mixed-reality-web/, Oct. 20, 2017, 5 Pages.

Walczak, et al., "Dynamic Creation of Interactive Mixed Reality Presentations", In Proceedings of the ACM Symposium on Virtual Reality Software and Technology, Nov. 7, 2005, pp. 167-176.

Zeller, et al., "Navigating the Windows Mixed Reality home", Retrieved From https://docs.microsoft.com/en-us/windows/mixed-reality/navigating-the-windows-mixed-reality-home, Mar. 21, 2018, 7 Pages.

Zeller, et al., "Performance recommendations for Unity", Retrieved From https://docs.microsoft.com/en-us/windows/mixed-reality/performance-recommendations-for-unity, Mar. 21, 2018, 7 Pages.

Zeller et al., "Spatial mapping", Retrieved From https://docs.microsoft.com/en-us/windows/mixed-reality/spatial-mapping, Mar. 21, 2018, 13 Pages.

* cited by examiner

DOWNLOADING OF THREE-DIMENSIONAL SCENE DATA FOR ASYNCHRONOUS NAVIGATION

BACKGROUND

As use of head-mounted display devices becomes more prevalent, an increasing number of users can participate in an experience in which content is displayed via augmented reality techniques, mixed reality techniques, and/or virtual reality techniques. Furthermore, more and more people are creating these experiences for a particular purpose (e.g., an employee training experience for new employee training, a marketing experience for potential purchasers of a service such as a vacation or an item such as a pair of skis, etc.).

Some conventional systems enable an experience to be consumed using a Web browser or an application of a computing device (e.g., a laptop computing device, a desktop computing device, a tablet computing device, a smartphone computing device, etc.). The experience can include multiple three-dimensional scenes accessible via one or more network locations such as a Web page, for example. A three-dimensional scene can be displayed on a display of the computing device. The user can use the Web browser or the application to switch between the different three-dimensional scenes on the display of the computing device. Moreover, the user can place a head-mounted display device, that is in some way connected to the computing device, on his or her head to consume a three-dimensional scene in a three-dimensional immersive environment.

However, conventional systems are limited in that a user must remove the head-mounted display device from his or her head in order to switch three-dimensional scenes displayed on the display of the computing device via the Web browser or the application executing on the computing device (e.g., switch from one URL to another URL). Then the user must place the head-mounted display device back on his or her head again to consume the next three-dimensional scene in three-dimensional immersive environment. This can frustrate the user experience.

SUMMARY

The techniques described herein immediately download data required to render and display multiple three-dimensional scenes that are part of an experience. In one example, the data can be downloaded from a network provider to computing device that is connected to a head-mounted display device (e.g., via a Universal Serial Bus connection, via a High-Definition Multimedia Interface connection, via a BLUETOOTH connection, etc.). In another example, the data can be downloaded from a network provider directly to a head-mounted display device. The experience may be one that is initially accessed using a Web browser or an application of a computing device configured to display content on a first display of the computing device. For instance, the user can access the experience via a Web page (e.g., a uniform resource locator (URL)).

When the user wants to view a three-dimensional scene of the experience in a three-dimensional immersive environment provided via a second display of the head-mounted display device, the user places the head-mounted display device on his or her head. The user can next provide input to activate a control indicating the consumption of the experience is being switched from the first display of the computing device to the second display of the head-mounted display device. In this way, the user can view the three-dimensional scene in a three-dimensional immersive environment that is not provided by the first display of the computing device. Alternatively, the head-mounted display device can comprise a sensor that determines (e.g., detects) that the head-mounted display device is currently being worn, and the head-mounted display device may coordinate with the computing device to deduce that the user has switched from consuming the content via the computing device to consuming the content via the head-mounted display device.

Based on the switch, the data required to render and display multiple three-dimensional scenes is downloaded from a network provider to the computing device, not only the data associated (i) a three-dimensional scene that is designated as a first three-dimensional scene to be displayed (e.g., a "home" three-dimensional scene, a "landing" three-dimensional scene, etc.) or (ii) a three-dimensional scene that is currently being displayed on the first display of the computing device. Accordingly, when a user provides input to navigate from one three-dimensional scene to a next three-dimensional scene while wearing the head-mounted display device, the corresponding data can be instantiated (e.g., loaded for rendering and display) without having to fetch the data from an external device (e.g., a network server, etc.) and/or without requiring the user to employ the computing device to switch scenes (e.g., use the Web browser to switch from one URL to the next URL).

Consequently, the data used to render and display each three-dimensional scene, of multiple three-dimensional scenes that are part of an experience, is immediately downloaded from a network provider when the user switches consumption of the experience to a three-dimensional immersive environment or when the user begins consuming the experience using a head-mounted display device. Yet data for individual ones of the three-dimensional scenes is instantiated (e.g., rendered and displayed) asynchronously based on user navigation to a next three-dimensional scene. By immediately downloading the data to render and display multiple three-dimensional scenes, an amount of time to transition a display from one three-dimensional scene to the next three-dimensional scene is limited (e.g., delays due to latency can be avoided). The techniques described herein can be useful in scenarios where the navigation pattern between three-dimensional scenes often varies from one user to the next (e.g., navigation patterns are asynchronous).

An experience can include two-dimensional scenes and/or three-dimensional scenes. Generally, an experience includes related and/or linked content that can be accessed and/or displayed for a particular purpose. As a specific example, an experience can include company content an employer wants a new employee to know, to be informed about, or to learn, and thus, the new employee can access the experience, from a network location, when he or she starts a new job. In various examples, an experience can include one or more spaces. A space comprises a segment or type of content within the broader experience. Continuing the example from above and to further illustrate, one space can include company content that relates to job training for a new employee, while another space in the same experience can include company content related to different interest and activity groups for which the employer provides a budget (e.g., a hiking group, a skiing group, a chess group, a religious study group, etc.). This example shows how the two types of content relate to a situation where a new employee is beginning employment with a company, yet the types of content are different and therefore different spaces can be part of a broader experience.

In various implementations, the experience can be accessed by a Web browser or an application, executing on a computing device, via one or more network locations (e.g., a Web page, an Intranet page, etc.). A head-mounted display device can be tethered to a computing device. Aspects of the experience can include, for example, one or more virtual reality (VR) three-dimensional scenes, one or more augmented reality (AR) three-dimensional scenes, and/or one or more mixed reality (MR) three-dimensional scenes. In one example, each three-dimensional scene can be associated with a uniform resource locator (URL) of a Web page. In alternative implementations, the experience can be accessed by a Web browser to an application, executing on a head-mounted display device, via one or more network locations.

The techniques described herein are configured to download data useable to render and display a plurality of three-dimensional scenes, that are each part of an experience, to (i) a computing device connected to a head-mounted display device, or (ii) directly to a head-mounted display device. In one example, the head-mounted display device is connected to a computing device that a user employs to initially access the experience. For instance, the connection can comprise a wired and/or wireless Universal Serial Bus (USB) connection, a High-Definition Multimedia Interface (HDMI) connection, a BLUETOOTH connection, a Wi-Fi connection, or another type of connection.

The computing device or the head-mounted display device stores the data in memory and identifies a first portion of the data associated with a first three-dimensional scene to be displayed. For example, the first three-dimensional scene to be displayed can include a scene that is currently displayed on a display of the computing device or a scene that is designated as an initial three-dimensional scene in the experience (e.g., a home scene, a landing scene, etc.). The head-mounted display device renders, using the first portion of the data, the first three-dimensional scene on a display so that it can be consumed by the user in a three-dimensional immersive environment (e.g., a three-dimensional coordinate space). Next, the computing device or the head-mounted display device receives user input to navigate from the first three-dimensional scene to a next three-dimensional scene, and based on this user input, another portion of the data from the memory that is useable to render and display the next three-dimensional scene is accessed.

In various examples, the user input to navigate, or switch, from one three-dimensional scene to the next can be based on an interaction with a displayed object (e.g., a two-dimensional object, a three-dimensional object). For instance, the user may employ a controlling mechanism, a gesture, a voice command, and/or user motion to select (e.g., click on, touch, walk through, etc.) the displayed object. The displayed object, in this example, can serve as a link between three-dimensional scenes. Accordingly, the display of the head-mounted display device may fade out of a currently displayed three-dimensional scene and fade into a newly displayed three-dimensional scene based on the user input.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

The techniques described herein immediately download data used to render and display each three-dimensional scene, of multiple three-dimensional scenes that are part of an experience. An experience can include two-dimensional scenes and/or three-dimensional scenes. Generally, an experience includes related and/or linked content that can be accessed and/or displayed for a particular purpose. The experience can initially be accessed using a computing device (e.g., a laptop, a tablet, a smartphone, etc.) that displays content on a first display (e.g., a screen that graphically projects or represents three-dimensional content on to a planar surface). In various examples, the immediate download is implemented in response to a user switching consumption of the experience from the first display of the computing device to a display of a head-mounted display device so three-dimensional scenes can be consumed in a three-dimensional immersive environment (e.g., a three-dimensional coordinate space displayed via the head-mounted display device). Data for individual ones of the three-dimensional scenes is instantiated (e.g., rendered and displayed) asynchronously based on user navigation to a next three-dimensional scene.

By immediately downloading the data to render and display multiple three-dimensional scenes, an amount of time to transition a display from one three-dimensional scene to the next three-dimensional scene is limited (e.g., delays due to latency can be avoided). The techniques described herein can be useful in scenarios where the navigation pattern between three-dimensional scenes often varies from one user to the next (e.g., navigation patterns are asynchronous across users).

Conventional systems are limited in that a user must remove the head-mounted display device from his or her head in order to switch three-dimensional scenes on a display of the computing device (e.g., switch from one URL to another URL via a Web browser executing on the computing device). Then the user must place the head-mounted display device back on his or her head again to consume the next three-dimensional scene in three-dimensional immersive environment. This removal and replacement of the head-mounted display device each time the user wants to consume a different three-dimensional scene, as required by the conventional systems, is an inefficient process that can cause delays and user frustration.

In contrast to the conventional process described above, the techniques described herein provide an efficient and effective way for the user to continue consuming content (e.g., multiple three-dimensional scenes) in the three-dimensional immersive environment without interruption and based on a user-determined navigation pattern.

Various examples, scenarios, and aspects are described below with reference to FIGS. 1-6.

Figure 1:
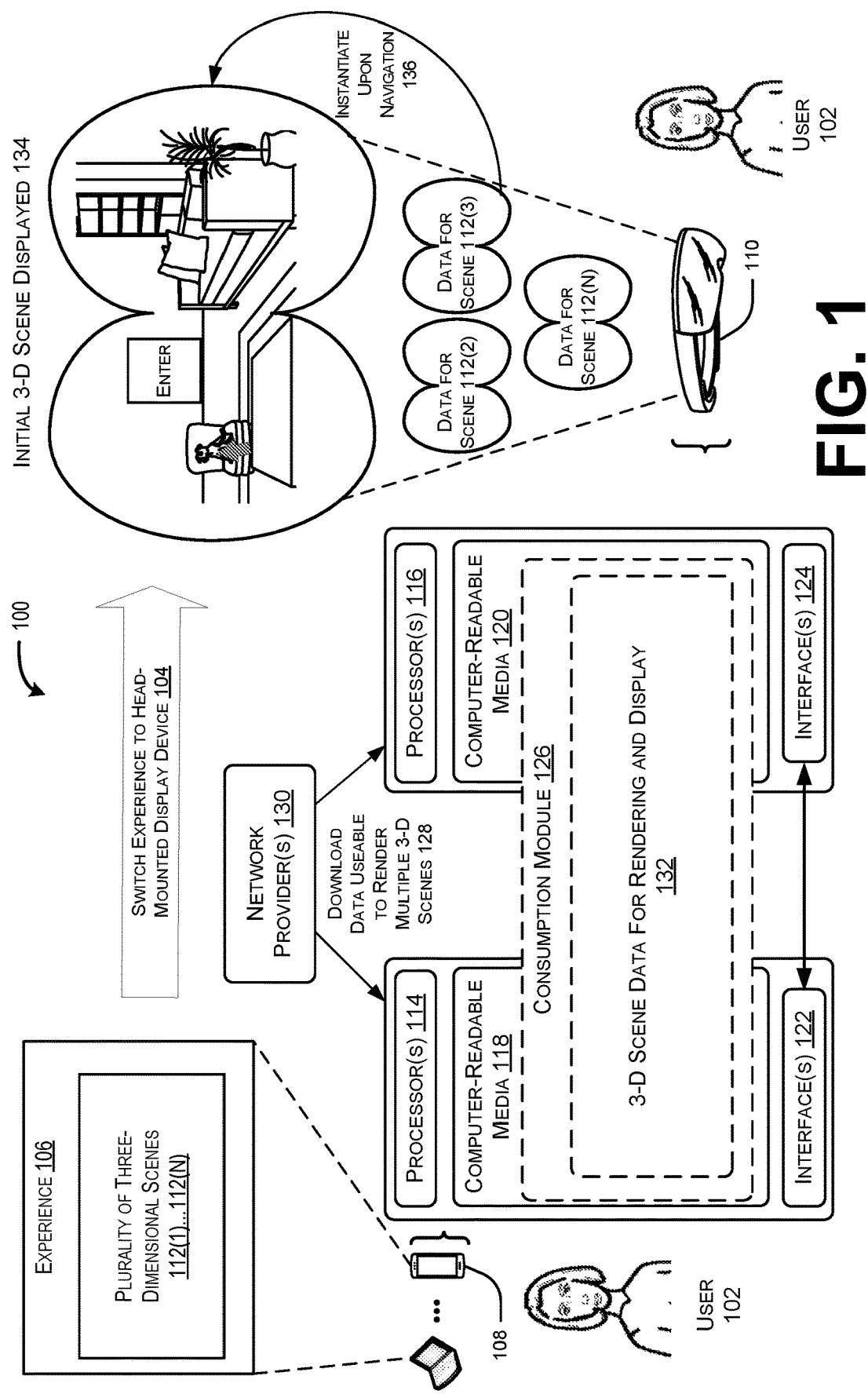
FIG. 1 is a diagram illustrating an example of how a user can switch consumption of an experience from a display of a computing device to a display of a head-mounted display device that is configured to display content in three-dimensional immersive environment, and how data useable to render multiple three-dimensional scenes that are part of the experience can be immediately downloaded to the computing device yet data for an individual three-dimensional scene is instantiated based on user navigation to the individual three-dimensional scene.

FIG. 1 is a diagram 100 illustrating an example of how a user 102 can switch 104 consumption of an experience 106 from a first display of a computing device 108 to a second display of a head-mounted display device 110 that is configured to display content in three-dimensional immersive environment. The content of the experience 106 includes three-dimensional scenes 112(1) through 112(N) (where N is a positive integer number such as two, three, four, five, ten, twenty, one hundred, etc.). In this example, the experience 106 can initially be accessed via one or more network locations (e.g., Web pages, Intranet pages, etc.) using a Web browser or an application executing on the computing device 108, such as a laptop computing device or smartphone computing device.

The computing device 108 and the head-mounted display device 110 may include processor(s) 114 and 116, examples of which are further described herein. Moreover, computing device 108 and the head-mounted display device 110 may include computer-readable media 118 and 120, as well as communication interface(s) 122 and 124, examples of which are further described herein. The computing device 108 and the head-mounted display device 110 may execute a consumption module 126 that coordinates and communicates across the device to provide functionality to enable the user to access and/or display scenes of the experience 106. For example, the consumption module(s) 126 can comprise an application installed on the devices and/or a component (e.g., a Web browser) configured to access a Web-enabled application.

Examples of a head-mounted display device 110 include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, or any augmented reality, mixed reality, and/or virtual reality devices.

Accordingly, in some instances, the head-mounted display device 110 may not include a processor or computer-readable media. Rather, the head-mounted display device 110 may comprise an output device configured to render data stored on the computing device 108 for display. For instance, the head-mounted display device 110 may be tethered to the computing device 112. Therefore, the interfaces 122, 124 of the computing device 108 and the head-mounted display device 110 can be configured to communicate via a wired and/or wireless Universal Serial Bus ("USB") connection, a High-Definition Multimedia Interface ("HDMI") connection, a BLUETOOTH connection, and so forth As the user 102 consumes the experience 106 on a display of the computing device 108, the user 102 may encounter a three-dimensional scene 112(1) of the experience that he or she would like to view via a three-dimensional immersive environment. That is, the user 102 may want to view content in a space or way that the head-mounted display device 110 can provide but that the display of the computing device 108 cannot provide. For instance, the display of the computing device 108 is likely a screen that graphically projects three-dimensional scene data on to a planar surface. Accordingly, the user 102 may place the head-mounted display device 110 on his or her head. Based on user input indicating such placement or detection of such placement (e.g., by a sensor of the head-mounted display device), consumption of the experience 106 is switched 104 from the computing device 108 to the head-mounted display device 110.

Based on the switch 104, the consumption module 126 is configured to download 128, from one or more network provider(s) 130 over network connection(s), data that is useable to render and display each of the three-dimensional scenes 112(1) through 112(N) that are part of the experience 106 (e.g., all the three-dimensional scenes). This download 128 occurs immediately after the switch 104, regardless of whether the user 102 has provided input or instruction to navigate to, or view, a particular three-dimensional scene using either the computing device 108 or the head-mounted display device 110. In one example, the data is downloaded as three-dimensional data 132 to the computing device 108 so the data is ready to be used for rendering and display on the display of the head-mounted display device 110 when a user navigates to a particular three-dimensional scene. In another example, the data is downloaded directly to the head-mounted display device 110.

When the user 102 switches 104 consumption of the experience 106 from the first display of the computing device 108 to the second display of the head-mounted display device 110, an initial three-dimensional scene is displayed in a three-dimensional immersive environment on the display of the head-mounted display device 110. The initial three-dimensional scene, such as three-dimensional scene 112(1), can comprise a current three-dimensional scene displayed on the display of the computing device 108 or a three-dimensional scene in the experience 106 that is designated as an initial three-dimensional scene to be displayed (e.g., a home three-dimensional scene, a landing three-dimensional scene, etc.). Accordingly, the data for the three-dimensional scene 112(1) is placed in a portion of memory on the computing device 108 and/or the head-mounted display device 110 that is used for rendering and displaying content. Moreover, the diagram 100 of FIG. 1 illustrates that data useable to render and display three-dimensional scene 112(2) of the experience 106 is downloaded, data useable to render and display three-dimensional scene 112(3) of the experience 106 is downloaded, data useable to render and display three-dimensional scene 112 (N) of the experience 106 is downloaded, and so forth, and such data is stored in the three-dimensional scene data for rendering and display 132.

Computing device 108 and/or head-mounted display device 110 can be configured with user input devices that enable the user 102 to navigate from a currently displayed three-dimensional scene to another three-dimensional scene. For example, the user input devices can include peripheral input devices such as a controller, a keyboard, a mouse, a pen, a voice input device, a touch input device, a gestural input device, a movement input device, and the like. In the example of the initially displayed three-dimensional scene 134 in FIG. 1, the user 102 may be able to move a displayed cursor to a position of the displayed dog object and provide an action that selects (e.g., clicks on) the dog object. Or, the user 102 may be able to move (e.g., walk forward) and "enter" a door in the back of the room. Based on the experience 106, either of these user inputs can signal, to the head-mounted display device 110 and/or the computing device 108, user navigation to a next three-dimensional scene (as further described below with respect to FIG. 2).

Accordingly, based on the user navigation to a next three-dimensional scene in the experience 106, the head-mounted display device 110 is configured to load previously downloaded (e.g., pre-fetched) data for the next three-dimensional scene into the portion of memory that is used by the head-mounted display device 110 for rendering and displaying content. This enables the next three-dimensional scene (e.g., three-dimensional scene 112(3)) to be instantiated (e.g., rendered and displayed) upon user navigation 136. The data useable to render an individual three-dimensional scene may be stored in an application layer (e.g., in accordance with browser run-time behavior) so that it can be accessed for rendering and display purposes.

Consequently, the computing device 108 and/or the head-mounted display device 110 contains the data needed to render and display each of the three-dimensional scenes 112(1) through 112(N) of an experience 106 to which the user 102 may possibly navigate, and thus, the computing device 108 and/or the head-mounted display device 110 is prepared to render and display a next three-dimensional scene in an efficient and effective manner. In other words, the computing device 108 and/or the head-mounted display device 110 is not required to retrieve three-dimensional scene data from the network provider(s) 130 (e.g., a network server) after the user 102 provides user input to navigate to a new three-dimensional scene. Furthermore, the user 102 is not required to remove the head-mounted display device 110 from his or her head, return to the consumption of the experience 106 via a display of the computing device 108, navigate to the new three-dimensional scene (e.g., a different URL) using the computing device 108, and place the head-mounted display device 110 back on his or her head to consume the new three-dimensional scene in a three-dimensional immersive environment.

In various examples, the consumption module 126 of the computing device 108 and/or the head-mounted display device 110 can display or be configured with a control to implement the switch 104 from consuming the experience 106 on a display of the computing device 108 to consuming the experience 106 in a three-dimensional immersive environment displayed via the head-mounted display device 110. A "control" can comprise a displayed graphical user interface (GUI) element (e.g., a button, an object, etc.) that is activated based on an interaction between the GUI element and user input (e.g., a user selects or clicks on the GUI element). A control can alternatively be configured to accept and/or detect other forms of input such as a voice command or a gesture. Thus, a control may be configured to receive user input but may not necessarily be displayed as a GUI element.

Figure 2:
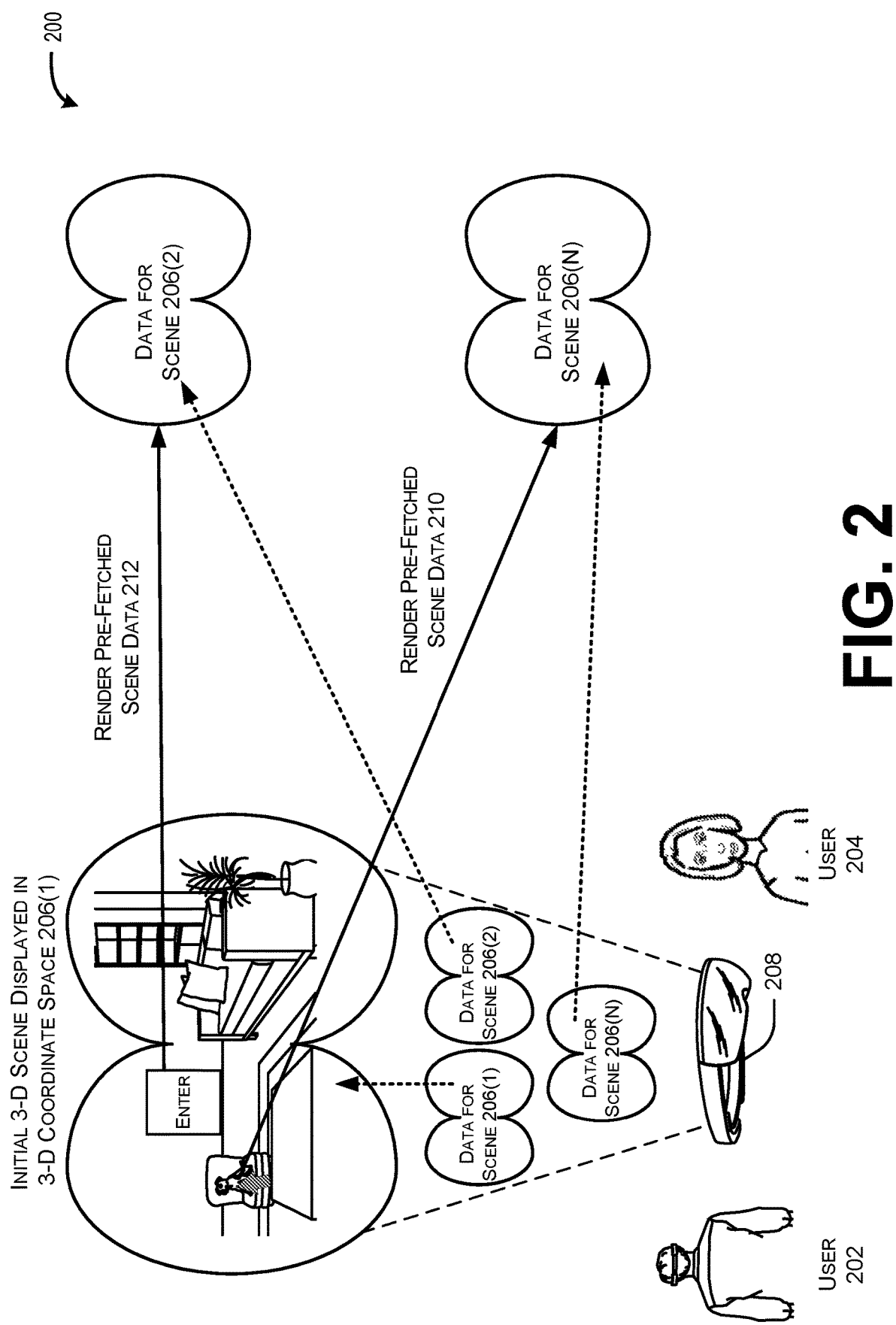
FIG. 2 is a diagram that illustrates an example of how the techniques described herein can be used to handle asynchronous navigation to different three-dimensional scenes by different users.

FIG. 2 is a diagram 200 that illustrates an example of how the techniques described herein can be used to handle asynchronous navigation to different three-dimensional scenes by different users (e.g., user 202 and user 204). For instance, while consuming a same experience that includes a plurality of three-dimensional scenes 206(1) through 206(N) (where N is a positive integer number such as two, three, four, five, ten, twenty, one hundred, etc.), both user 202 and user 204 may start the three-dimensional part of the experience by consuming at an initial three-dimensional scene 206(1) (e.g., a home three-dimensional scene, a landing three-dimensional scene, etc.). While viewing the initial three-dimensional scene 206(1), a head-mounted display device 208 worn by one of user 202 or user 204 does not know if he or she is going to move a cursor to the dog object and click on the dog object to navigate to a next three dimensional scene in the experience, or if he or she is going to walk forward and "enter" the door to another room in order to navigate to a next three dimensional scene in the experience.

Accordingly, via the immediate download of data useable to render each of the three-dimensional scenes 206(1) through 206(N) in the experience, the head-mounted display device 208 is prepared to render and display multiple different "next" three-dimensional scenes in an asynchronous manner. For instance, user 202 may move a cursor to the dog object and click on the dog object which causes the head-mounted display device 208 being worn by the user 202 to use pre-fetched scene data to render 210 three-dimensional scene 206(N) as a next three-dimensional scene for display in the experience. In contrast, user 204 may walk forward and "enter" the door to another room which causes the head-mounted display device 208 being worn by the user 204 to use pre-fetched data to render 212 three-dimensional scene 206(2) as a next three-dimensional scene for display in the experience.

Consequently, a head-mounted display device 208, or a computing device connected to the head-mounted display device, does not need to wait until a navigation determination is made (e.g., to which three-dimensional scene is a user going to navigate) to retrieve and/or download corresponding three-dimensional scene data from a network provider in order to render a next three-dimensional scene. Rather, the data for all the three-dimensional scenes in an experience is immediately downloaded, or pre-fetched, which allows efficient display transitions between three-dimensional scenes. For example, the head-mounted display device 208 can be configured to fade out of an old three-dimensional scene and fade into a new three-dimensional scene.

In various examples, the dog object and the door comprise links, or anchor points, that are configured to enable navigation between three-dimensional scenes. When consumption of an experience begins, these links and anchor points can be used by the computing device 108 and/or the head-mounted display device 110 to identify each of the three-dimensional scenes that are part of the same experience, so that corresponding data can be downloaded. In alternative implementations, an experience may provide a list of all the three-dimensional scenes that are part of the experience when a user first enters the experience, so that corresponding data can be downloaded.

Figure 3:
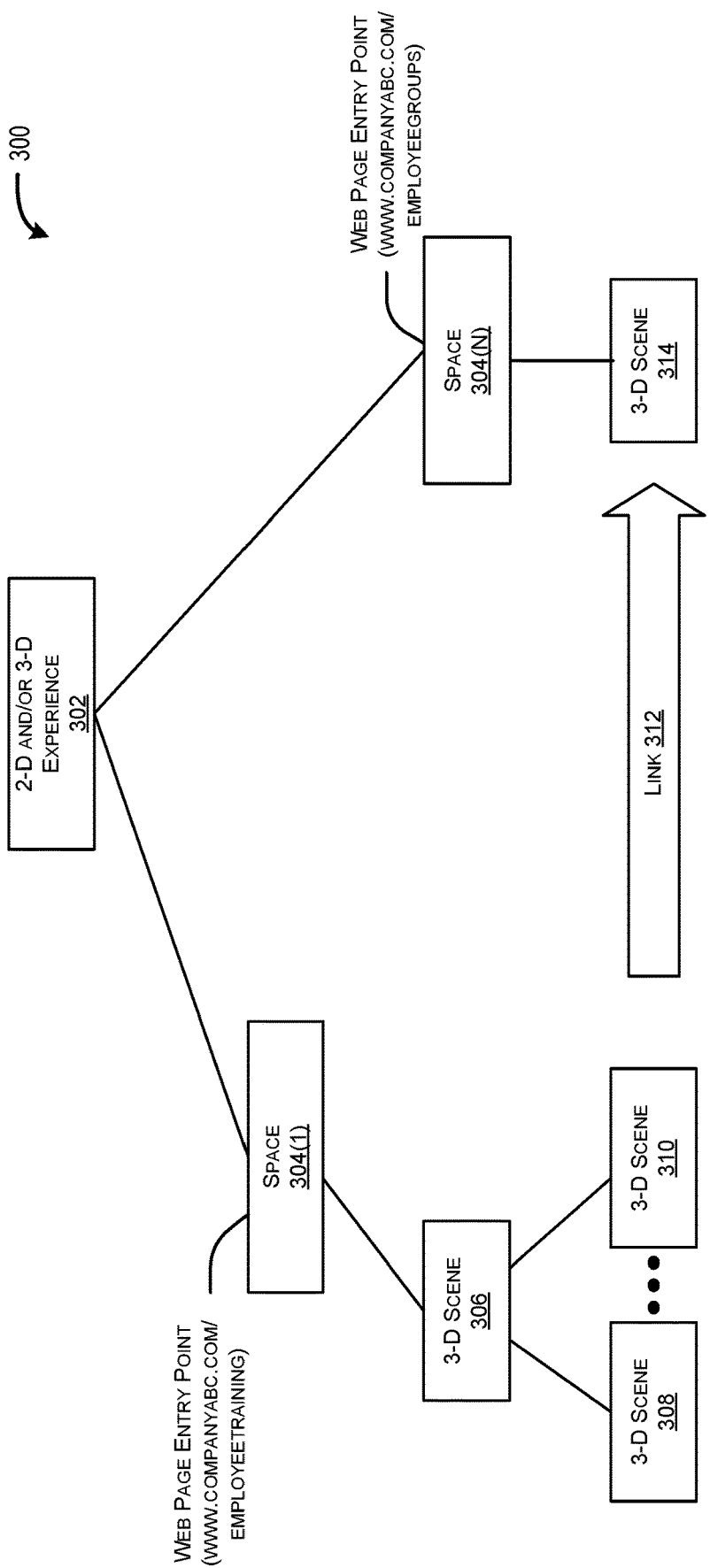
FIG. 3 is a diagram illustrating an example experience, of which three-dimensional scene(s) being consumed by a user can be a part.

FIG. 3 is a diagram 300 illustrating an example experience 302, of which three-dimensional scene(s) being consumed by a user can be a part. As shown, the experience 302 can include two-dimensional scenes and/or three-dimensional scenes. Generally, an experience 302 includes related and/or linked content that can be accessed and/or displayed for a particular purpose. As a specific example, the experience 302 can include company content an employer wants a new employee to know, to be informed about, or to learn, and thus, the new employee can access the experience 302 when he or she starts a new job. In another specific example, the experience 302 can include lesson content a school teacher wants a student to know, to be informed about, or to learn, and thus, the student can access the experience when he or she dives into a particular lesson.

An experience 302 can include one or more spaces 304(1) through 304(N) (where N is a positive integer number such as one, two, three, four, and so forth). A space comprises a segment or type of content within the broader experience 302. There is no limitation how one segment or type of content can be distinguished from another segment or type of content in the same experience 302. Moreover, an experience may only include a single space. Continuing an example from above and to further illustrate, space 304(1) can include company content that relates to job training for a new employee, while space 304(N) can include company content related to different interest and activity groups for which the employer provides a budget (e.g., a hiking group, a skiing group, a chess group, a religious study group, etc.). The employer may have a policy to inform a new employee about these interest and activity groups when he or she starts a new job, so the new employee can join if a common interest is shared. This example shows how the two types of content relate to a situation where a new employee is beginning employment with a company, yet the types of content are different and therefore different spaces can be created and/or consumed within a broader experience 302.

As described above, a space can include three-dimensional scenes. In various implementations, an entry point for a user to consume a space can comprise a Web page or an Intranet page (e.g., a URL), initially accessed via the computing device 108. For instance, a new employee can visit "www.companyABC.com/employeetraining" on his or her computing device 108 to enter space 304(1) that is part of the broader experience 302. The new employee can also visit "www.companyABC.com/employeegroups" on his or her computing device 108 to enter space 304(N) that is part of the broader experience 302. In a specific example, space 304(1) may include a home page that displays two-dimensional content (e.g. text and a few images). This home page may include a first link to three-dimensional scene 306, which may contain links to three-dimensional scene 308 and three-dimensional scene 310. The three-dimensional scenes 306, 308, and 310 may also include links, or anchor points, that enable navigation to one another in a three-dimensional immersive environment. The new employee can consume the three-dimensional scenes 306, 308, and 310 in a three-dimensional immersive environment using a head-mounted display device 110 connected to a computing device 108. These three-dimensional scenes 306, 308, and 310 can also comprise URLs that are part of the Web page (e.g., "www-.companyABC.com/employeetraining/3Dscene308" and "www.companyABC.com/employeetraining/3Dscene310"). Moreover, a scene 310 in a first space 304(1) can provide a link 312 (e.g., via the selection of a three-dimensional object) to a three-dimensional scene 314 in a second space 304(N).

Accordingly, the consumption of three-dimensional scenes, as described herein, can be implemented as part of an experience 302 designed for a particular type of user (e.g., a new employee, a student of a class, etc.). In various examples, the experience 302 can be associated with one or more Web pages, yet aspects of the experience 302 can include, for example, one or more virtual reality (VR) three-dimensional scenes, one or more augmented reality (AR) three-dimensional scenes, and/or one or more mixed reality (MR) three-dimensional scenes. While the experience 302 shown in the example diagram 300 of FIG. 3 shows a limited number of spaces and scenes, it is understood in the context of this disclosure, that an experience can include any number of spaces (e.g., one, two, three, four, five, ten, twenty, one hundred) for related content and any number of scenes (e.g., one, two, three, four, five, ten, twenty, one hundred, etc.).

Figure 4:
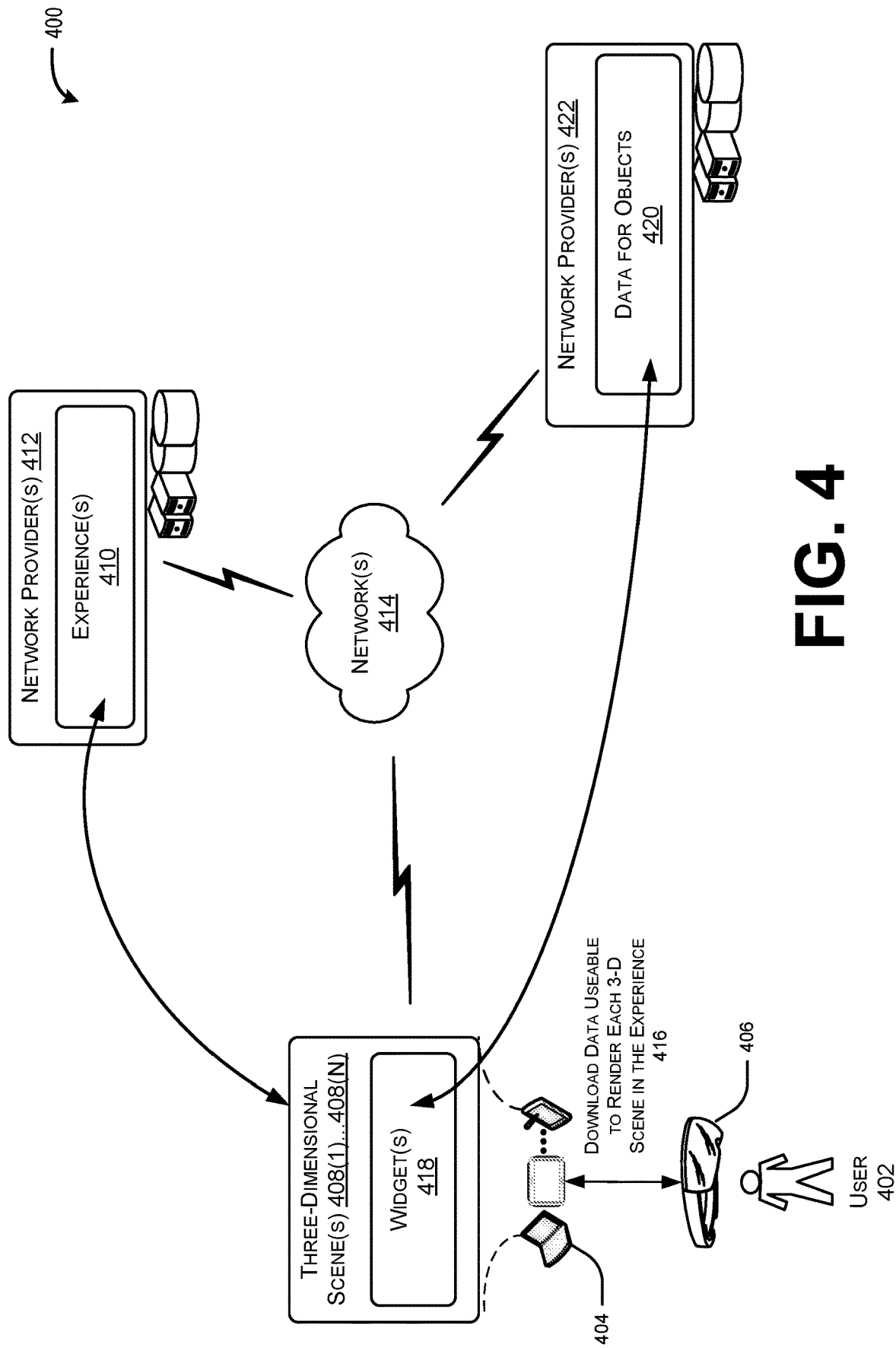
FIG. 4 is a diagram that illustrates an example of how network communications can be used to implement the techniques described herein.

FIG. 4 is a diagram 400 that illustrates an example of how network communications can be used to implement the techniques described herein. The diagram 400 illustrates a user 402 (e.g., the user 102 of FIG. 1) that employs a computing device 404 and/or a head-mounted display device 406 to consume an experience that comprises a plurality of three-dimensional scenes 408(1) through 408(N) (where N is a positive integer number such as two, three, four, five, ten, twenty, one hundred, etc.). The three-dimensional scenes 408(1) through 408(N) may be part of an experience 410 that is hosted or made available by one or more network provider(s) 412 (e.g., content and/or service providers). Consequently, the three-dimensional scenes 408(1) through 408(N) of an experience 410 can be accessed, over network(s) 414, by the computing device 404 and/or the head-mounted display device 406, via various URLs.

As described above, the user 402 may switch consumption of an experience 410 from a display of the computing device 404 to a display of the head-mounted display device 406 so one or more of the three-dimensional scenes 408(1) through 408(N) can be consumed in a three-dimensional immersive environment. Based on the switch, the computing device 404 is configured to download 416 data, from network provider(s) 412, that is useable to render and display each of the three-dimensional scenes 408(1) through 408 (N). For instance, a Web browser or an application of the computing device 404 retrieves the data from the network provider(s) 412 and stores the data for rendering and display by the head-mounted display device 406. In an alternative example, the user 402 may enter the experience using the head-mounted display device 406 (e.g., view an initial three-dimensional scene) and the head-mounted display can directly access the network provider(s) 412 and retrieve and download the data without going through the computing device 404.

In various implementations, some of the data downloaded 416 to the computing device 404 and/or the head-mounted display device 406 as part of a three-dimensional scene may be referred to by a widget 418. A widget 418 comprises information useable to access and display content such as an object or a collection of related objects that share an environment attribute. For instance, a widget 418 may be configured to access a pair of skis. Or a widget 418 may be configured to access a pair of skis and ski poles since they each share a common attribute—a single user uses them to ski down a hill. In one example, the widget 418 is embedded in a three-dimensional scene and can comprise a uniform resource locator (URL) useable to access data 420 to render the object or the collection of related objects in the three-dimensional scene via one or more network providers 422. Network provider(s) 422 may be the same as or different than network provider(s) 412.

Consequently, an individual three-dimensional scene can include content that may have been designed by different developers and/or providers. To this end, an individual three-dimensional scene can include a list of widgets useable to render objects in the individual three-dimensional scene. Moreover, the computing device 404 and/or the head-mounted display device 406 uses the list of widgets to download 416 the data, for example, based on the user 402 switching consumption of an experience 410 from a display the computing device 404 to a display of the head-mounted display device 406.

A computing device, such as computing devices 108 and 404, can include, but is not limited to: a game console, a desktop computer, a laptop computer, a gaming device, a tablet computer, a personal data assistant (PDA), a mobile phone/tablet hybrid, a telecommunication device, a network-enabled television, a terminal, an Internet of Things (IoT) device, a work station, a media player, or any other sort of computing device. In some implementations, the computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a printer, audio speakers, a haptic output device, and the like).

Network(s), such as network(s) 414, can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

In various implementations, the interfaces of a computing device and a head-mounted display device can be configured to operate in accordance with, and communicate over, a personal area network (PAN) that uses a wired and/or a wireless connection. For example, a PAN connection can operate in accordance with Infrared Data Association ("IrDA"), BLUETOOTH, wired and/or wireless Universal Serial Bus ("USB"), Z-Wave, ZIGBEE, or other short-range wireless technology.

As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The module provided in FIG. 1 is an example, and the number of modules used to implement the techniques described herein can vary higher or lower. That is, functionality described herein in association with the illustrated modules can be performed by a fewer number of modules or a larger number of modules on one device or spread across multiple devices.

Figure 5:
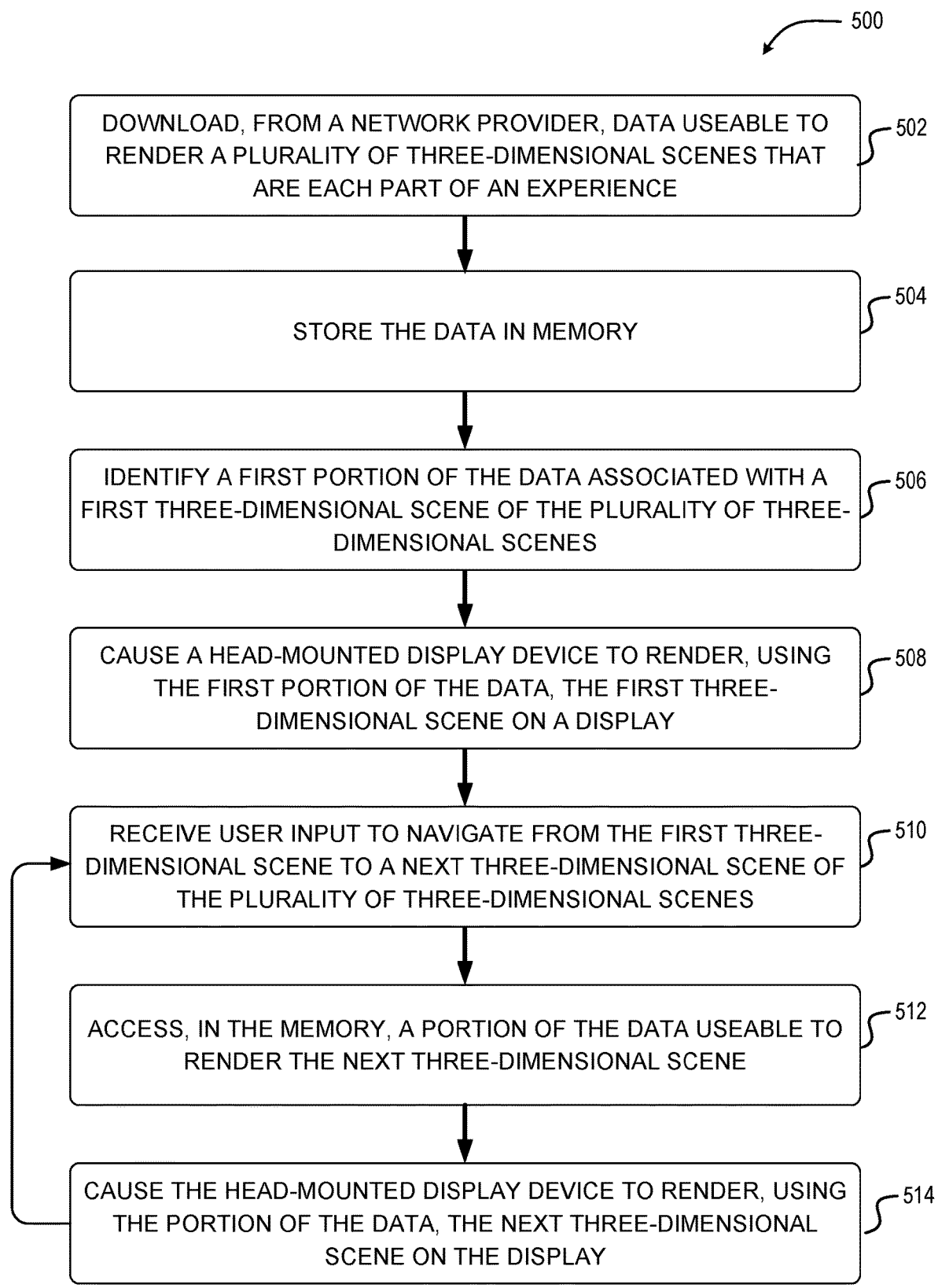
FIG. 5 is a diagram of an example flowchart that illustrates operations directed to immediately downloading data to render each of a plurality of three-dimensional scenes that are part of an experience based on a user switching consumption of the experience from a display of a computing device to a display of a head-mounted display device, but waiting until user navigation to instantiate the data for an individual three-dimensional scene.
Figure 6:
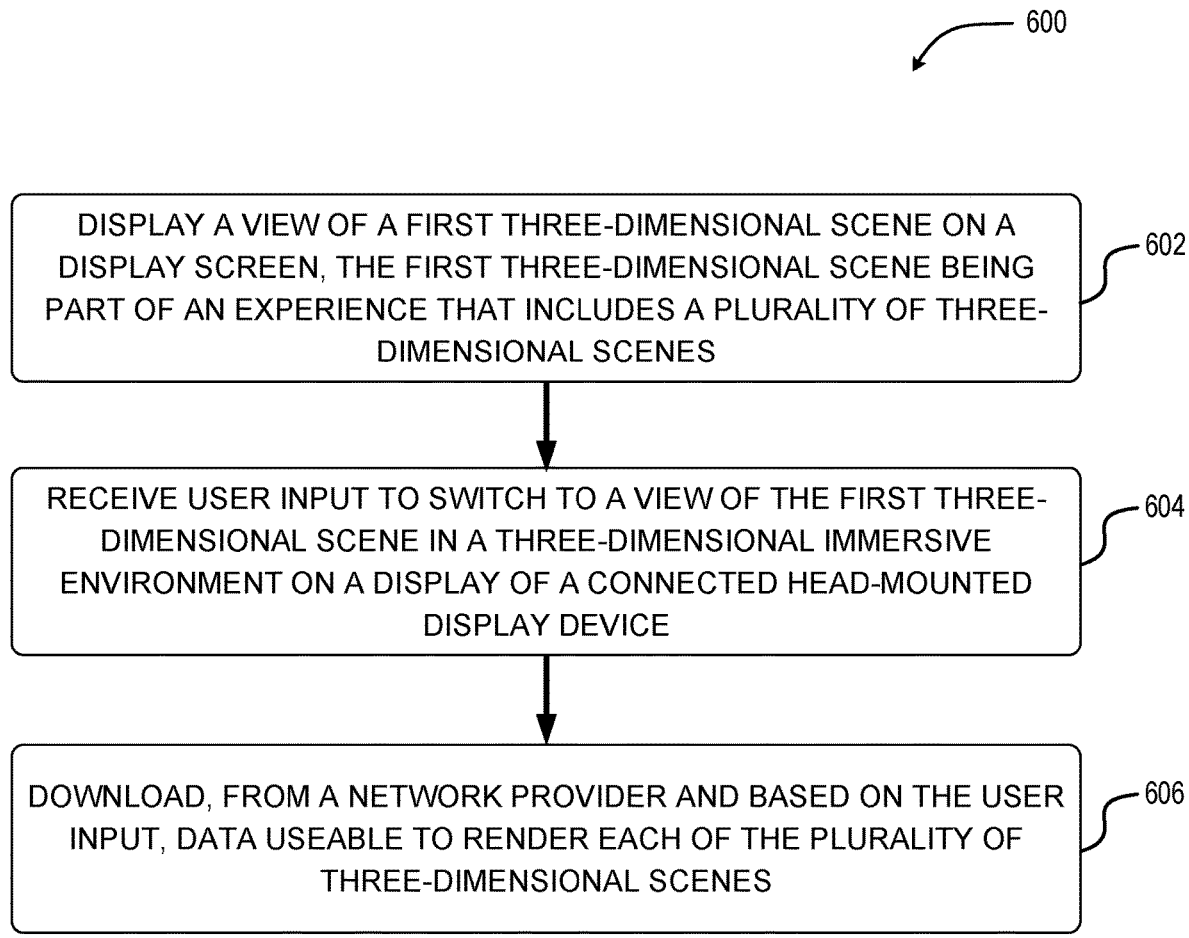
FIG. 6 is a diagram of an example flowchart that illustrates operations directed to downloading and preparing data for rendering by a head-mounted display device so that the head-mounted display device is capable of rendering each of a plurality of three-dimensional scenes that are part of an experience based on user navigation and without the head-mounted display device, or a computing device to which the head-mounted display device is connected, having to retrieve additional data from a network provider after the user navigation occurs.

FIGS. 5 and 6 each contains a flowchart of a method. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., computing device 108, a head-mounted display device 110, and/or devices of a network provider).

FIG. 5 is a diagram of an example flowchart 500 that illustrates operations directed to immediately downloading data to render each of a plurality of three-dimensional scenes that are part of an experience based on a user switching consumption of the experience from a display of a computing device to a display of a head-mounted display device, but waiting until user navigation to instantiate the data for an individual three-dimensional scene. The operations in FIG. 5 can be performed by the computing device 108 and/or the head-mounted display device 110.

At operation 502, a device downloads data useable to render a plurality of three-dimensional scenes that are each part of an experience. The data can be downloaded from a server of a network provider. The download can be implemented in response to user activation of a control configured to indicate a switch from consuming the experience on a display of the computing device to consuming the experience on a display of the head-mounted display device. Alternatively, the download can be implemented in response to sensor detection of placement of the head-mounted display device on a head of the user.

At operation 504, the data is stored in memory of the device (e.g., the computing device and/or the head-mounted display device).

At operation 506, the device identifies a first portion of the data associated with a first three-dimensional scene of the plurality of three-dimensional scenes. As described above, the first three-dimensional scene can comprise a scene that is currently displayed on a display of the computing device or a scene designated as an initial three-dimensional scene in the experience.

At operation 508, the head-mounted display device is caused to render, using the first portion of the data, the first three-dimensional scene on a display.

At operation 510, user input to navigate from the first three-dimensional scene to a next (e.g., second) three-dimensional scene of the plurality of three-dimensional scenes is received.

At operation 512, another portion of the data that is stored in memory and that is useable to render the next three-dimensional scene is accessed.

At operation 514, the head-mounted display device is caused to render, using the other portion of the data, the next three-dimensional scene on the display.

As shown via the arrow that returns to operation 510 from operation 514, the pre-fetched data can continue to be accessed and used to render three-dimensional scenes asynchronously based on a user-determined navigation pattern.

FIG. 6 is a diagram of an example flowchart 600 that illustrates operations directed to downloading and preparing data for rendering by a head-mounted display device so that the head-mounted display device is capable of rendering each of a plurality of three-dimensional scenes that are part of an experience based on user navigation and without the head-mounted display device, or a computing device to which the head-mounted display device is connected, having to retrieve additional data from a network provider after the user navigation occurs. The operations in FIG. 6 can be performed by the computing device 108.

At operation 602, a computing device displays a view of a first three-dimensional scene on a display screen. The first three-dimensional scene is one of a plurality of three-dimensional scenes that are part of an experience.

At operation 604, the computing device receives user input to switch from the view of the first three-dimensional scene on the display screen of the computing device to a view of the first three-dimensional scene in a three-dimensional immersive environment on a display of a connected head-mounted display device.

At operation 606, the computing device downloads, from a network provider and based at least in part on the user input, data useable to render each of the plurality of three-dimensional scenes that are part of the experience. As described above, by downloading the data, an individual three-dimensional scene, of the plurality of three dimensional scenes, is capable of being rendered on the display of the head-mounted display device based on user navigation to the individual three-dimensional scene and without requiring the computing device to download additional data for the individual three-dimensional scene from the network provider after the user navigation to the individual three-dimensional scene occurs.

The disclosure presented herein may be considered in view of the following example clauses.

Example Clause A, a device comprising: a display; an interface that connects to a head-mounted display device; at least one processor; and memory storing instructions that, when executed by the at least one processor, causes the device to perform operations comprising: downloading, from a network provider, data useable to render a plurality of three-dimensional scenes that are each part of an experience; storing the data in the memory; identifying a first portion of the data associated with a first three-dimensional scene of the plurality of three-dimensional scenes, wherein the first three-dimensional scene is at least one of a scene that is currently displayed on the display of the device or a scene designated as an initial three-dimensional scene in the experience; causing the head-mounted display device to render, using the first portion of the data, the first three-dimensional scene on a display of the head-mounted display device; receiving user input to navigate from the first three-dimensional scene to a second three-dimensional scene of the plurality of three-dimensional scenes; accessing, in the memory, a second portion of the data useable to render the second three-dimensional scene; and causing the head-mounted display device to render, using the second portion of the data, the second three-dimensional scene on the display of the head-mounted display device.

Example Clause B, the device of Example Clause A, wherein the experience is hosted by a Web page, each individual three-dimensional scene of the plurality of three-dimensional scenes corresponding to a uniform resource locator of the Web page.

Example Clause C, the device of Example Clause A, wherein the experience is hosted by multiple Web pages that are linked together, each individual three-dimensional scene of the plurality of three-dimensional scenes corresponding to a uniform resource locator of one of the multiple Web pages.

Example Clause D, the device of any one of Example Clauses A through C, wherein the downloading is implemented in response to user input that switches from a view of the first three-dimensional scene on the display of the device to a view of the first three-dimensional scene in a three-dimensional immersive environment provided via the display of the head-mounted display device.

Example Clause E, the device of Example Clause D, wherein the downloading is implemented via a Web browser.

Example Clause F, the device of Example Clause E, wherein an individual three-dimensional scene of the plurality of three-dimensional scenes includes a list of one or more widgets useable to render one or more objects in the individual three-dimensional scene, and wherein the one or more widgets are used by the Web browser to access and download the data via one or more uniform resource locators.

Example Clause G, the device of any one of Example Clauses A through F, wherein the operations further comprise: causing the display of the head-mounted display device to fade out of the first three-dimensional scene; and causing the display of the head-mounted display device to fade into the second three-dimensional scene.

While Example Clauses A through G are described above with respect to a device, it is understood in the context of this disclosure that the subject matter of Example Clauses A through G can additionally or alternatively be implemented as a method or via computer readable storage media.

Example Clause H, a method comprising: downloading, to a device, data useable to render a plurality of three-dimensional scenes that are each part of an experience; storing the data in a memory of the device; identifying a first portion of the data associated with a first three-dimensional scene of the plurality of three-dimensional scenes; causing a display to render, using the first portion of the data, the first three-dimensional scene; receiving user input to navigate from the first three-dimensional scene to a second three-dimensional scene of the plurality of three-dimensional scenes; accessing, in the memory, a second portion of the data useable to render the second three-dimensional scene; and causing the display to render, using the second portion of the data, the second three-dimensional scene.

Example Clause I, the method of Example Clause H, wherein the experience is hosted by a Web page, each individual three-dimensional scene of the plurality of three-dimensional scenes corresponding to a uniform resource locator of the Web page.

Example Clause J, the method of Example Clause H, wherein the experience is hosted by multiple Web pages that are linked together, each individual three-dimensional scene of the plurality of three-dimensional scenes corresponding to a uniform resource locator of one of the multiple Web pages.

Example Clause K, the method of any one of Example Clauses H through J, wherein: the display comprises a display of a head-mounted display device; the device comprises a computing device that is connected to the head-mounted display device; and the downloading is implemented in response to user input that switches from a view of the first three-dimensional scene on a display of the computing device to a view of the first three-dimensional scene in a three-dimensional immersive environment on the display of the head-mounted display device.

Example Clause L, the method of any one of Example Clauses H through J, wherein the device comprises a head-mounted display device.

Example Clause M, the method of any one of Example Clauses H through L, wherein an individual three-dimensional scene of the plurality of three-dimensional scenes includes a list of one or more widgets useable to render one or more objects in the individual three-dimensional scene, and wherein the one or more widgets are used to access and download the data.

Example Clause N, the method of any one of Example Clauses H through M, further comprising: fading out of the first three-dimensional scene; and fading into the second three-dimensional scene.

While Example Clauses H through N are described above with respect to a method, it is understood in the context of this disclosure that the subject matter of Example Clauses H through N can additionally or alternatively be implemented by a device or via computer readable storage media.

Example Clause O, a device comprising: a display; an interface that connects to a head-mounted display device; at least one processor; and memory storing instructions that, when executed by the at least one processor, causes the device to perform operations comprising: displaying a view of a first three-dimensional scene on the display, the first three-dimensional scene being part of an experience that includes a plurality of three-dimensional scenes; receiving user input to switch from the view of the first three-dimensional scene on the display of the device to a view of the first three-dimensional scene in a three-dimensional immersive environment on a display of the head-mounted display device; and downloading, from a network provider and based at least in part on the user input, data useable to render the plurality of three-dimensional scenes such that an individual three-dimensional scene, of the plurality of three dimensional scenes, is capable of being rendered on the display of the head-mounted display device based on user navigation to the individual three-dimensional scene.

Example Clause P, the device of Example Clause O, wherein the experience is hosted by a Web page, each three-dimensional scene of the plurality of three-dimensional scenes corresponding to a uniform resource locator of the Web page.

Example Clause Q, the device of Example Clause O, wherein the experience is hosted by multiple Web pages that are linked together, each three-dimensional scene of the plurality of three-dimensional scenes corresponding to a uniform resource locator of one of the multiple Web pages.

Example Clause R, the device of any one of Example Clauses O through Q, wherein the data is downloaded via a Web browser.

Example Clause S, the device of Example Clause R, wherein the individual three-dimensional scene includes a list of one or more widgets useable to render one or more objects in the individual three-dimensional scene, and wherein the one or more widgets are used by the Web browser to access the data via one or more uniform resource locators.

Example Clause T, the device of any one of Example Clauses O through S, wherein the individual three-dimensional scene is capable of being rendered on the display of the head-mounted display device without the device downloading additional data for the individual three-dimensional scene from the network provider after the user navigation to the individual three-dimensional scene occurs.

While Example Clauses O through T are described above with respect to a device, it is understood in the context of this disclosure that the subject matter of Example Clauses O through T can additionally or alternatively be implemented as a method or via computer readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
    a display;
    an interface that connects to a head-mounted display device;
    at least one processor; and
    memory storing instructions that, when executed by the at least one processor, causes the device to perform operations comprising:
        determining that user input indicates a switch from viewing a first three-dimensional scene currently being displayed on the display of the device to viewing the first three-dimensional scene in a three-dimensional immersive environment provided via a display of the head-mounted display device;
        downloading, from a network provider, data useable to render a plurality of three-dimensional scenes that are each part of an experience, wherein the plurality of three-dimensional scenes include the first three-dimensional scene;
        storing the data in the memory;
        identifying a first portion of the data associated with the first three-dimensional scene of the plurality of three-dimensional scenes;
        causing the head-mounted display device to render, using the first portion of the data, the first three-dimensional scene on the display of the head-mounted display device;
        receiving user input to navigate from the first three-dimensional scene to a second three-dimensional scene of the plurality of three-dimensional scenes;
        accessing, in the memory, a second portion of the data useable to render the second three-dimensional scene; and
        causing the head-mounted display device to render, using the second portion of the data, the second three-dimensional scene on the display of the head-mounted display device.

2. The device of claim 1, wherein the experience is hosted by a Web page, each individual three-dimensional scene of the plurality of three-dimensional scenes corresponding to a uniform resource locator of the Web page.

3. The device of claim 1, wherein the experience is hosted by multiple Web pages that are linked together, each individual three-dimensional scene of the plurality of three-dimensional scenes corresponding to a uniform resource locator of one of the multiple Web pages.

4. The head-mounted display device of claim 1, wherein the downloading is implemented via a Web browser.

5. The head-mounted display device of claim 4, wherein an individual three-dimensional scene of the plurality of three-dimensional scenes includes a list of one or more widgets useable to render one or more objects in the individual three-dimensional scene, and wherein the one or more widgets are used by the Web browser to access and download the data via one or more uniform resource locators.

6. The head-mounted display device of claim 1, wherein the operations further comprise:
casing the display of the head-mounted display device to fade out of the first three-dimensional scene; and
causing the display of the head-mounted display device to fade into the second three-dimensional scene.

7. A method comprising:
determining that user input indicates a switch from viewing a first three-dimensional scene currently being displayed on a display of a device to viewing the first three-dimensional scene in a three-dimensional immersive environment provided via a display of a head-mounted display device that is connected to the device;
downloading, to the device, data useable to render a plurality of three-dimensional scenes that are each part of an experience, wherein the plurality of three-dimensional scenes include the first three-dimensional scene;
storing the data in a memory of the device;
identifying a first portion of the data associated with a first three-dimensional scene of the plurality of three-dimensional scenes;
causing the display of the head-mounted display device to render, using the first portion of the data, the first three-dimensional scene;
receiving user input to navigate from the first three-dimensional scene to a second three-dimensional scene of the plurality of three-dimensional scenes;
accessing, in the memory, a second portion of the data useable to render the second three-dimensional scene; and
causing the display of the head-mounted display device to render, using the second portion of the data, the second three-dimensional scene.

8. The method of claim 7, wherein the experience is hosted by a Web page, each individual three-dimensional scene of the plurality of three-dimensional scenes corresponding to a uniform resource locator of the Web page.

9. The method of claim 7, wherein the experience is hosted by multiple Web pages that are linked together, each individual three-dimensional scene of the plurality of three-dimensional scenes corresponding to a uniform resource locator of one of the multiple Web pages.

10. The method of claim 7, wherein an individual three-dimensional scene of the plurality of three-dimensional scenes includes a list of one or more widgets useable to render one or more objects in the individual three-dimensional scene, and wherein the one or more widgets are used to access and download the data.

11. The method of claim 7, further comprising:
fading out of the first three-dimensional scene; and
fading into the second three-dimensional scene.

12. A device comprising:
a display;
an interface that connects to a head-mounted display device;
at least one processor; and
memory storing instructions that, when executed by the at least one processor, causes the device to perform operations comprising:
displaying a view of a first three-dimensional scene on the display, the first three-dimensional scene being part of an experience that includes a plurality of three-dimensional scenes;
receiving user input to switch from the view of the first three-dimensional scene on the display of the device to a view of the first three-dimensional scene in a three-dimensional immersive environment on a display of the head-mounted display device; and
downloading, from a network provider and based at least in part on the user input, data useable to render the plurality of three-dimensional scenes such that an individual three-dimensional scene, of the plurality of three dimensional scenes, is capable of being rendered on the display of the head-mounted display device based on user navigation to the individual three-dimensional scene.

13. The device of claim 12, wherein the experience is hosted by a Web page, each three-dimensional scene of the plurality of three-dimensional scenes corresponding to a uniform resource locator of the Web page.

14. The device of claim 12, wherein the experience is hosted by multiple Web pages that are linked together, each three-dimensional scene of the plurality of three-dimensional scenes corresponding to a uniform resource locator of one of the multiple Web pages.

15. The device of claim 12, wherein the data is downloaded via a Web browser.

16. The device of claim 15, wherein the individual three-dimensional scene includes a list of one or more widgets useable to render one or more objects in the individual three-dimensional scene, and wherein the one or more widgets are used by the Web browser to access the data via one or more uniform resource locators.

17. The device of claim 12, wherein the individual three-dimensional scene is capable of being rendered on the display of the head-mounted display device without the device downloading additional data for the individual three-dimensional scene from the network provider after the user navigation to the individual three-dimensional scene occurs.

* * * * *